United States Patent [19]

Pembroke

[11] 3,892,007

[45] July 1, 1975

[54] TAPE CLEANER VACUUM INTERLOCK

[75] Inventor: Richard W. Pembroke, Tulsa, Okla.

[73] Assignee: Telex Computer Products, Inc., Tulsa, Okla.

[22] Filed: Apr. 18, 1974

[21] Appl. No.: 461,866

[52] U.S. Cl. .............................. 15/306 A; 242/182
[51] Int. Cl. .............................................. A47l 5/38
[58] Field of Search ............. 15/306 R, 306 A, 308; 242/182

[56] References Cited

UNITED STATES PATENTS

| | | | |
|---|---|---|---|
| 3,189,928 | 6/1965 | Pendleton | 15/306 A |
| 3,370,982 | 2/1968 | Hayunga | 15/306 A X |
| 3,779,481 | 12/1973 | Wilson | 242/182 |

*Primary Examiner*—Harvey C. Hornsby
*Assistant Examiner*—C. K. Moore

[57] ABSTRACT

Tape cleaning apparatus for use in a magnetic tape transport mechanism, said apparatus designed and constructed for communicating vacuum to a tape cleaner head from a vacuum column to achieve an automatic interlock arrangement which permits vacuum to be present at the tape cleaner head only after the vacuum columns have been loaded.

4 Claims, 3 Drawing Figures

TAPE CLEANER VACUUM INTERLOCK

BACKGROUND OF THE INVENTION

1. Field of the Invention

This invention relates to improvements in tape cleaning apparatus in tape transport mechanism, and more particularly, but not by way of limitation, to a means for transmitting vacuum to the cleaning head only when the vacuum columns have been loaded.

2. Description of the Prior Art

In tape transport mechanisms, or the like, such as magnetic tape recording apparatus used for storing digital data used in conjunction with electronic data processing systems, or other similar devices, electromagnetic reading heads (sometimes called read/write heads) are usually adapted to be positioned adjacent the tape so as to cause a change in the residual flux condition of the magnetic oxide on the tape, or to read or sense the residual flux conditions already on the tape. In electronic data processing systems in particular, there is usually a great need for storing vast quantities of digital data on a tape in relatively small areas. Due to the number of pulses stored along a given length of tape in a particular channel or track, the positioning of the read/write head is frequently very critical and the presence of any dust or particles on the tape may cause an unwanted displacement of the read/write head with respect to the tape, and result in a loss of information retrieval or storage.

Consequently, tape cleaner devices have been developed to remove contaminates from the tape, such as that shown by the Margery F. Hagadorn U.S. Pat. No. 3,683,445, issued Aug. 15, 1972, and entitled "Tape Cleaning Device". Many of these devices employ vacuum immediately behind the cleaning surface, said vacuum serving to continually carry away and prevent fouling of the cleaning device. A fouled cleaning blade may easily deposit collected contaminates back onto the tape, particularly in areas wherein a tape direction change occurs. These vacuum cleaning devices have certain disadvantages, however, in that the latest technology used in tape transport mechanism frequently includes critical aerodynamic device integrated into the tape path for facilitating the automatic threading of the tape leader through the tape transport mechanism. In a typical tape transport, this mechanism typically consists of a read/write head, a tape cleaner device, an end-of-tape/beginning-of-tape sensor, right hand guide, left hand guide, and drive capstan. During the automatic threading of the tape leader over, under and around the components of the transport mechanism, any aerodynamic disturbance of even the slighest nature causes a marked reduction in the autothread reliability. If vacuum is allowed to remain connected to the cleaning device during the automatic threading sequence, it has been found that the natural attraction of the tape to the cleaner surface (because of the pressure difference across the tape) constitutes a significant force which impairs theading reliability. Since the presently available vacuum-cleaner head devices are usually supplied with vacuum directly from the vacuum source, this problem is great.

SUMMARY OF THE INVENTION

The present invention contemplates a novel tape cleaner vacuum interlock which has been particularly designed and constructed for overcoming the above disadvantages of tape cleaner combined with vacuum. The novel apparatus provides a by-pass fluid passageway between one of the vacuum columns and the tape cleaner head, said vacuum column being loaded only when the tape has been threaded into or through the automatic threading mechanism and onto the machine reel. During threading of the tape, the cleaning head is open to atmospheric pressure only, thus assuring equalization of pressure on both sides of the tape, and precluding unwanted interference with the the autothreading operation. An automatic interlocked arrangement is thus achieved wherein vacuum is transmitted to the cleaner head only when the vacuum columns are loaded, as opposed to a direct connection between the vacuum supply and the cleaner head. This novel arrangement assures a foolproof method of cleaner vacuum control, without further external control, or additional devices. Of course, this concept may be utilized in substantially any arrangement requiring low volume vacuum only after a tape unit's vacuum columns have been loaded.

DESCRIPTION OF THE PREFERRED EMBODIMENT

Figure 1:
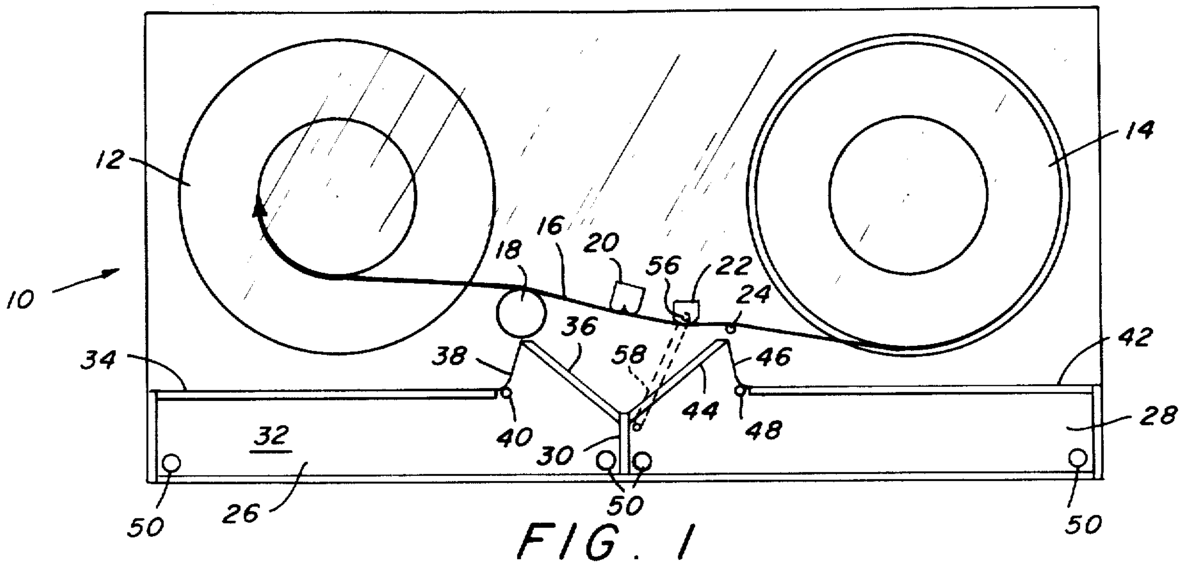
FIG. 1 is a front elevational view of a tape transport mechanism embodying the invention and depicting the portion of the tape being threaded thereon with the vacuum columns in an open or unloaded condition.

Referring to the drawings in detail, reference character 10 generally indicates a tape transport mechanism comprising a first rotatable tape receiving or machine reel 12 and a second rotatable tape storage or file reel 14 suitably supported on a wall 13 of the apparatus 10, as is well known. A tape 16 is normally stored on or carried by the file reel 14, as is well known, and may be threaded onto the machine reel 12 in any suitable manner, such as by an automatic threading system (not shown) for transporting the tape from the file reel 14 onto the machine reel 12, and from the machine reel 12 back onto the file reel 14.

The tape 16 is normally threaded around and over a capstan 18, a read/write head 20 and a tape cleaner 22, as well as an idler roller 24 and the tape 16 moves adjacent these components during the transporting thereof upon utilization of the apparatus 10.

A first vacuum column 26 is provided for the apparatus 10 separated from a second vacuum column 28 by a common plate or central wall member 30. One side of each vacuum column 26 and 28 is closed by the wall 13, and the opposite side thereof is closed by a suitable cover plate 32, which is preferably a glass plate, but not limited thereto. A partition 34 closes a portion of the vacuum column 26 from the proximity of the machine reel 12, and an angularly disposed partition 36 extends from the central wall 30 in a direction toward the machine reel 12 and/or capstan 18 as clearly shown in FIGS. 1 and 2. The outer end of the partition 36 terminates at a position spaced from the inner end of the partition 34 to provide a hiatus, or mouth, 38 therebetween, and a suitable idler roller 40 similar to the roller 24 is suitably journaled in the proximity of the inner end of the partition 34. A partition 42 similar to the partition 34 closes a portion of the vacuum column 28 in the proximity of the file reel 14 and an angularly disposed partition 44 similar to the partion 38 extends from the central wall 30 in a direction toward the file reel 14 and/or idler roller 24. The outer end of the partition 44 terminates at a position spaced from the inner end of the partition 42 to provide a hiatus or mouth 46 therebetween, and an idler roller 48 similar to the rollers 24 and 40 is suitably journalled in the proximity of the inner end of the partition 42. In addition, a plurality of suitable vacuum ports 50 are provided in each vacuum column 26 and extend through the wall 13 into communication with the vacuum system (not shown) through suitable conduits 52, or the like, as is well known.

A port 54 is provided in the wall 13 and extends into communication with one of the vacuum columns, such as the column 28. A complementary port 56 is provided in the wall 13 extending into communication with the tape cleaner 22, or in the proximity thereof, as desired. A suitable by-pass or passageway 58 is provided between the ports 54 and 56 for transmitting pressure between the vacuum column 28 and the tape cleaner 22. Of course, an external conduit (not shown) may be provided in lieu of the passageway 58, if desired.

During operation of the tape transport apparatus 10, vacuum is continuously directed to the vacuum columns 26 and 28 through the ports 50 as is well known. However, as long as the mouths 38 and 46 of the columns 26 and 28, respectively, are open, the columns 26 and 28 will remain at substantially atmospheric pressure, and atmospheric pressure is maintained surrounding the capstan 18, read/write head 20 and tape cleaner 22. The tape 16 may be threaded through the apparatus 10 from the file reel 14 to the machine reel 12 in the usual manner, and preferably by means of a suitable automatic threading apparatus (not shown), but not limited thereto. It will be apparent that the atmospheric pressure within the column 28 is transmitted to the tape cleaner 22 at all times during the threading operation, thus assuring no application of vacuum in the proximity of the cleaner 22.

Figure 2:
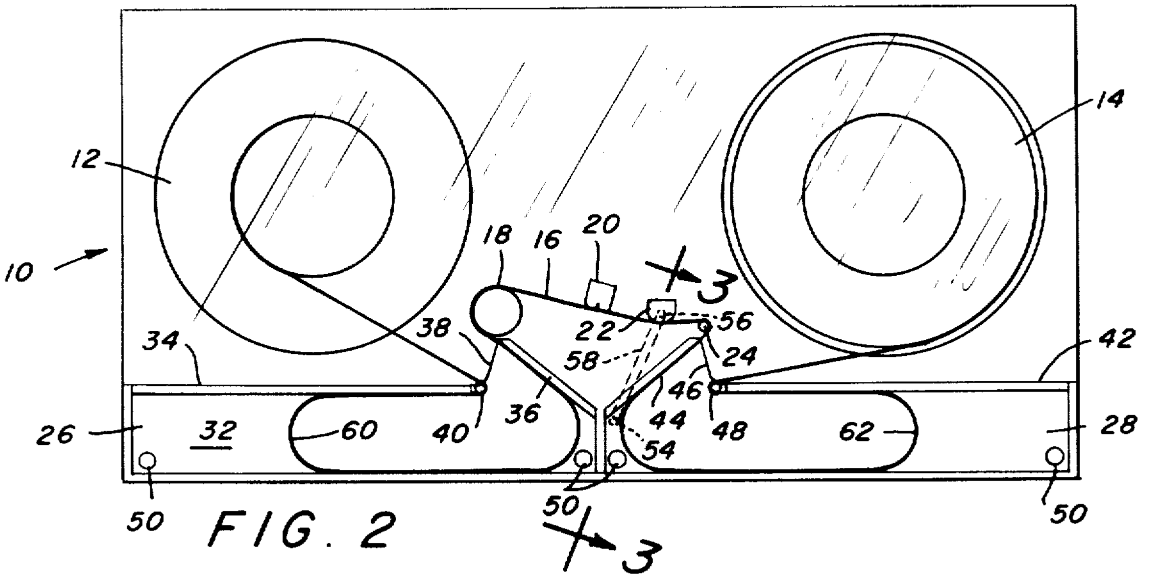
FIG. 2 is a view similar to FIG. 1 and depicting the tape position with the vacuum columns in a loaded condition.
Figure 3:
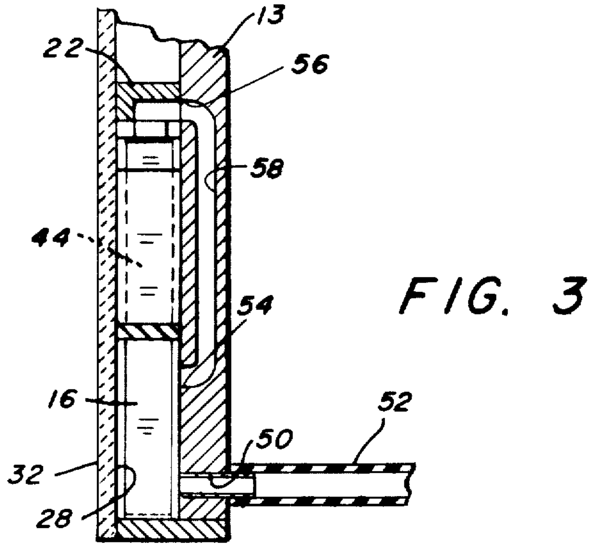
FIG. 3 is a sectional view taken on line 3—3 of FIG. 2 with one vacuum port shown in section for purposes of illustration.

When the tape 16 has been threaded over and around the capstan 18, read/write head 20, tape cleaner 22, and idler 34 as shown in FIG. 1, the machine reel 12 may be slacked off in any well known manner (not shown) in order that a sufficient length of the tape 16 will be unreeled for forming a loop in the tape at the opening or mouth 38 of the vacuum column 26, and the file reel 14 may be slowly unwound for unreeling a sufficient length of tape for forming a loop at the opening or mouth 46 of the vacuum column 28. This may be accomplished in any suitable well known manner, as for example with the use of a vacuum brake (not shown) as disclosed in my copending application filed on or about Mar. 15, 1974, and entitled "Vacuum Column Loading Interlock".

When a loop forms in the tape 16 over the mouths 38 and 46, the mouths 38 and 46 are closed, thus loading or creating a vacuum within the columns 26 and 28, respectively. Of course, the vacuum pulls the tape 16 further into the columns 26 and 28 to ultimately form loops as shown at 60 and 62 in FIG. 2. The loops 60 and 62 seal the columns 26 and 28, respectively, and maintain a vacuum between the loops and the confines or walls of the columns 26 and 28, as is well known. It is to be noted that the port 54 is particularly positioned with respect to the ultimate loops 60 and 62 as to be in the vacuum area of the column 28, and the vacuum at the port 54 is transmitted through the by-pass conduit 58 to the port 56 and to the tape cleaner 22, or in the proximity thereof for pulling dust particles or other contaminates from the tape 16 and into the vacuum system of the apparatus 10.

From the foregoing it will be apparent that the present invention provides a novel tape cleaner vacuum interlock wherein vacuum is applied to the tape cleaner only subsequent to the threading of the tape through the apparatus, the vacuum columns are open at atmospheric pressure, and only when the tape has been threaded into the apparatus is vacuum treated in the vacuum columns, said vacuum being communicated to the tape cleaner only when the vacuum columns have been loaded. The novel vacuum interlock means provides a foolproof method of cleaner vacuum control which is simple and efficient in operation and economical and durable in construction.

Whereas the present invention has been described in particular relation to the drawings attached hereto, it should be understood that other and further modifications apart from those shown or suggested herein, may be made within the spirit and scope of this invention.

What is claimed is:

1. In a vacuum controlled tape transport mechanism having first and second tape reels, and a capstan and a read/write head and a tape cleaner interposed between the reels for receiving the tape therearound, the improvement in apparatus for applying vacuum to the tape cleaner comprising:

a. first and second vacuum columns in constant communication with the vacuum system of the tape transport mechanism, each of said vacuum columns being provided with a mouth in the proximity of the path of travel of the tape, the mouth of each vacuum column being open during threading of the tape from one reel to the other reel whereby the pressure in each vacuum column is substantially atmospheric pressure, the mouth of each vacuum column being closed by a loop of the tape subsequent to the threading of the tape whereby a vacuum is established in each vacuum column; and b. passageway means providing constant communication between one of said vacuum columns and the tape cleaner whereby the pressure at the tape cleaner is substantially atmospheric pressure during threading of the tape from one reel to the other and a vacuum is established at the tape cleaner subsequent to threading of the tape.

2. The improvement as set forth in claim 1 wherein the passageway means includes a port provided in one of said vacuum columns and positioned with relation to said tape loop therein during the closed condition thereof for communicating vacuum to the tape cleaner and for communicating atmospheric pressure to the tape cleaner when the said one vacuum column is open.

3. The improvement as set forth in claim 1 wherein the passageway means comprises a first port provided in one of said vacuum columns, a second port provided in the proximity of the tape cleaner, and conduit means extending between said ports for constantly communicating the pressure in the said one vacuum column to the proximity of the tape cleaner.

4. The combination as set forth in claim 3 wherein the said first port is positioned in the said one vacuum column in relation to the tape loop disposed therein during the closed condition thereof whereby the said first port is open to vacuum in the closed condition of the vacuum column and open to substantially atmospheric pressure in the open condition of the vacuum column.

* * * * *